United States Patent
Raghavan et al.

(10) Patent No.: US 12,032,857 B2
(45) Date of Patent: Jul. 9, 2024

(54) SYSTEM AND METHOD FOR SHALLOW COPY

(71) Applicant: Nutanix, Inc., San Jose, CA (US)

(72) Inventors: Ajaykrishna Raghavan, Santa Clara, CA (US); Anand Varma Chekuri, Durham, NC (US); Roger Liao, St. Louis, MO (US)

(73) Assignee: Nutanix, Inc., San Jose, CA (US)

( * ) Notice: Subject to any disclaimer, the term of this patent is extended or adjusted under 35 U.S.C. 154(b) by 86 days.

(21) Appl. No.: 17/981,783

(22) Filed: Nov. 7, 2022

(65) Prior Publication Data
US 2023/0161505 A1    May 25, 2023

Related U.S. Application Data

(60) Provisional application No. 63/282,094, filed on Nov. 22, 2021.

(51) Int. Cl.
G06F 3/06    (2006.01)

(52) U.S. Cl.
CPC .......... G06F 3/0659 (2013.01); G06F 3/0604 (2013.01); G06F 3/0644 (2013.01); G06F 3/0673 (2013.01)

(58) Field of Classification Search
None
See application file for complete search history.

(56) References Cited

U.S. PATENT DOCUMENTS

| | | | |
|---|---|---|---|
| 5,802,309 A | | 9/1998 | Cook et al. |
| 5,960,194 A | * | 9/1999 | Choy ............ G06F 16/278 |
| | | | 707/999.102 |
| 6,209,128 B1 | | 3/2001 | Gerard et al. |
| 6,775,673 B2 | | 8/2004 | Mahalingam et al. |
| 7,260,563 B1 | | 8/2007 | Priyadarshi et al. |
| 7,395,279 B2 | | 7/2008 | Iyengar et al. |

(Continued)

FOREIGN PATENT DOCUMENTS

| CN | 113406169 A | 9/2021 |
|---|---|---|
| EP | 4 006 737 A1 | 6/2022 |

(Continued)

OTHER PUBLICATIONS

"Adding Objects to Versioning—Enabled Buckets", from https://docs.aws.amazon.com/AmazonS3/latest/dev/AddingObjectstoVersioningEnabledBuckets.html, (Oct. 2, 2019).

(Continued)

*Primary Examiner* — William E. Baughman
(74) *Attorney, Agent, or Firm* — Foley & Lardner LLP

(57) ABSTRACT

An illustrative embodiment disclosed herein is an apparatus including a processor having programmed instructions to create a global region that is associated with a first bucket partition and a second bucket partition different from the first bucket partition, provide, to the global region, region information of a source region in which a source object is stored, create a destination region in which a destination object is stored, and provide, to the destination region, from the global region, the region information of the source region. In some embodiments, the source region is in the first bucket partition and the destination region is in the second bucket partition.

20 Claims, 9 Drawing Sheets

(56) References Cited

U.S. PATENT DOCUMENTS

| | | | |
|---|---|---|---|
| 7,461,912 B2 | 12/2008 | Kamiyama et al. | |
| 7,653,668 B1 | 1/2010 | Shelat et al. | |
| 7,685,109 B1 | 3/2010 | Ransil et al. | |
| 7,721,044 B1 | 5/2010 | Chatterjee et al. | |
| 7,774,329 B1* | 8/2010 | Peddy | G06Q 30/02 707/790 |
| 8,019,732 B2 | 9/2011 | Paterson-Jones et al. | |
| 8,166,128 B1 | 4/2012 | Faulkner et al. | |
| 8,250,033 B1 | 8/2012 | De Souter et al. | |
| 8,311,859 B2 | 11/2012 | Patoureaux et al. | |
| 8,312,027 B2 | 11/2012 | Lamb et al. | |
| 8,352,424 B2 | 1/2013 | Zunger et al. | |
| 8,429,242 B1 | 4/2013 | Todd | |
| 8,533,181 B2* | 9/2013 | Hu | G06F 16/2455 707/718 |
| 8,549,518 B1 | 10/2013 | Aron et al. | |
| 8,554,724 B2 | 10/2013 | Zunger | |
| 8,601,473 B1 | 12/2013 | Aron et al. | |
| 8,683,112 B2 | 3/2014 | Drobychev et al. | |
| 8,799,222 B2 | 8/2014 | Marathe et al. | |
| 8,849,759 B2 | 9/2014 | Bestler et al. | |
| 8,850,130 B1 | 9/2014 | Aron et al. | |
| 8,863,124 B1 | 10/2014 | Aron | |
| 8,930,693 B2 | 1/2015 | Holt et al. | |
| 8,997,088 B2 | 3/2015 | Gurikar et al. | |
| 9,003,335 B2 | 4/2015 | Lee et al. | |
| 9,009,106 B1 | 4/2015 | Aron et al. | |
| 9,043,372 B2 | 5/2015 | Makkar et al. | |
| 9,043,567 B1 | 5/2015 | Modukuri et al. | |
| 9,052,942 B1 | 6/2015 | Barber et al. | |
| 9,069,708 B2 | 6/2015 | Gill et al. | |
| 9,069,983 B1 | 6/2015 | Nijjar | |
| 9,110,882 B2 | 8/2015 | Overell et al. | |
| 9,256,498 B1 | 2/2016 | Leibowitz et al. | |
| 9,336,132 B1 | 5/2016 | Aron et al. | |
| 9,342,253 B1 | 5/2016 | Muthukkaruppan et al. | |
| 9,350,623 B1 | 5/2016 | Shadi et al. | |
| 9,405,806 B2 | 8/2016 | Lysne et al. | |
| 9,652,265 B1 | 5/2017 | Narayanasamy et al. | |
| 9,705,970 B2 | 7/2017 | Pomerantz et al. | |
| 9,747,287 B1 | 8/2017 | Bhardwaj et al. | |
| 9,772,866 B1 | 9/2017 | Aron et al. | |
| 9,805,054 B2 | 10/2017 | Davis et al. | |
| 10,003,650 B2 | 6/2018 | Shetty et al. | |
| 10,095,549 B1 | 10/2018 | Needham et al. | |
| 10,120,902 B2 | 11/2018 | Erdogan et al. | |
| 10,152,428 B1 | 12/2018 | Alshawabkeh et al. | |
| 10,176,225 B2 | 1/2019 | Naidu et al. | |
| 10,296,255 B1 | 5/2019 | Tummala | |
| 10,380,078 B1 | 8/2019 | Kumar et al. | |
| 10,409,837 B1 | 9/2019 | Schmidt et al. | |
| 10,430,084 B2 | 10/2019 | Goss et al. | |
| 10,528,262 B1 | 1/2020 | Shmuylovich et al. | |
| 10,565,230 B2 | 2/2020 | Zheng et al. | |
| 10,592,495 B1 | 3/2020 | Shami et al. | |
| 10,659,520 B1 | 5/2020 | Sethuramalingam et al. | |
| 10,691,464 B1 | 6/2020 | Drego et al. | |
| 10,725,826 B1 | 7/2020 | Sagar et al. | |
| 10,740,302 B2 | 8/2020 | Slik et al. | |
| 10,747,752 B2 | 8/2020 | Krishnaswamy et al. | |
| 10,802,975 B2 | 10/2020 | Gottin et al. | |
| 10,915,497 B1 | 2/2021 | Bono et al. | |
| 11,048,545 B2 | 6/2021 | Kedem | |
| 11,086,545 B1 | 8/2021 | Dayal et al. | |
| 11,099,938 B2 | 8/2021 | Desai et al. | |
| 2001/0034733 A1 | 10/2001 | Prompt et al. | |
| 2002/0065776 A1 | 5/2002 | Calder et al. | |
| 2002/0078065 A1 | 6/2002 | Agulhon | |
| 2003/0023587 A1 | 1/2003 | Dennis et al. | |
| 2003/0145310 A1 | 7/2003 | Thames et al. | |
| 2003/0172094 A1 | 9/2003 | Lauria et al. | |
| 2003/0191745 A1 | 10/2003 | Jiang et al. | |
| 2004/0186826 A1 | 9/2004 | Choi et al. | |
| 2005/0273571 A1 | 12/2005 | Lyon et al. | |
| 2006/0041661 A1 | 2/2006 | Erickson et al. | |
| 2006/0047636 A1 | 3/2006 | Mohania et al. | |
| 2006/0080443 A1 | 4/2006 | Kruglick et al. | |
| 2006/0080646 A1 | 4/2006 | Aman | |
| 2006/0161704 A1 | 7/2006 | Nystad et al. | |
| 2007/0088744 A1 | 4/2007 | Webber et al. | |
| 2008/0034307 A1 | 2/2008 | Cisler et al. | |
| 2008/0263222 A1* | 10/2008 | Matsuzawa | G06F 16/258 709/238 |
| 2009/0171697 A1 | 7/2009 | Glauser et al. | |
| 2009/0327621 A1 | 12/2009 | Kliot et al. | |
| 2010/0042673 A1 | 2/2010 | Dayley | |
| 2010/0050173 A1 | 2/2010 | Hensbergen | |
| 2010/0293174 A1 | 11/2010 | Bennett et al. | |
| 2011/0082962 A1 | 4/2011 | Horovitz et al. | |
| 2011/0137966 A1 | 6/2011 | Srinivasan et al. | |
| 2011/0185355 A1 | 7/2011 | Chawla et al. | |
| 2011/0213884 A1 | 9/2011 | Ferris et al. | |
| 2011/0258297 A1 | 10/2011 | Nightingale et al. | |
| 2012/0096052 A1 | 4/2012 | Tolia et al. | |
| 2012/0096205 A1 | 4/2012 | Velayudhan et al. | |
| 2012/0210095 A1 | 8/2012 | Nellans et al. | |
| 2012/0293886 A1 | 11/2012 | Abe et al. | |
| 2012/0331065 A1 | 12/2012 | Aho et al. | |
| 2012/0331243 A1 | 12/2012 | Aho et al. | |
| 2013/0054523 A1 | 2/2013 | Anglin et al. | |
| 2013/0103884 A1 | 4/2013 | Cho | |
| 2013/0198472 A1 | 8/2013 | Fang et al. | |
| 2013/0246431 A1 | 9/2013 | Ahuja et al. | |
| 2013/0332608 A1 | 12/2013 | Shiga et al. | |
| 2014/0095459 A1 | 4/2014 | Eshel et al. | |
| 2014/0115154 A1* | 4/2014 | Mack-Crane | H04L 47/785 709/224 |
| 2014/0173227 A1 | 6/2014 | Min et al. | |
| 2014/0279838 A1 | 9/2014 | Tsirogiannis et al. | |
| 2014/0282626 A1 | 9/2014 | Muguda | |
| 2014/0339117 A1 | 11/2014 | Quan et al. | |
| 2014/0379840 A1 | 12/2014 | Dao | |
| 2015/0012571 A1 | 1/2015 | Powell et al. | |
| 2015/0046586 A1 | 2/2015 | Zhang et al. | |
| 2015/0046600 A1 | 2/2015 | Kim | |
| 2015/0079966 A1 | 3/2015 | Govindarajeswaran et al. | |
| 2015/0208985 A1 | 7/2015 | Huang | |
| 2015/0254325 A1 | 9/2015 | Stringham | |
| 2015/0286413 A1 | 10/2015 | Olson et al. | |
| 2015/0378767 A1 | 12/2015 | Tarasuk-Levin et al. | |
| 2016/0011805 A1* | 1/2016 | Nakagawa | G06F 3/0619 711/114 |
| 2016/0048408 A1 | 2/2016 | Madhu et al. | |
| 2016/0092326 A1 | 3/2016 | Wu et al. | |
| 2016/0117226 A1 | 4/2016 | Hetrick et al. | |
| 2016/0162547 A1 | 6/2016 | Morris | |
| 2016/0188407 A1 | 6/2016 | Bronnikov et al. | |
| 2016/0207673 A1 | 7/2016 | Shlonsky et al. | |
| 2016/0275125 A1 | 9/2016 | Drobychev et al. | |
| 2016/0306643 A1 | 10/2016 | Klee et al. | |
| 2017/0075909 A1 | 3/2017 | Goodson et al. | |
| 2017/0091235 A1 | 3/2017 | Yammine et al. | |
| 2017/0109348 A1* | 4/2017 | Nagaraj | G06F 16/211 |
| 2017/0109421 A1 | 4/2017 | Stearn et al. | |
| 2017/0235764 A1 | 8/2017 | Sharpe et al. | |
| 2017/0235818 A1 | 8/2017 | Gorski et al. | |
| 2017/0242746 A1 | 8/2017 | King et al. | |
| 2017/0344575 A1 | 11/2017 | Naylor et al. | |
| 2017/0351450 A1 | 12/2017 | Brandl et al. | |
| 2018/0165161 A1 | 6/2018 | Slater et al. | |
| 2018/0205791 A1 | 7/2018 | Frank et al. | |
| 2018/0287996 A1* | 10/2018 | Tripathy | H04L 61/2514 |
| 2018/0292999 A1 | 10/2018 | Nadkarni | |
| 2018/0349463 A1 | 12/2018 | Bernhardy et al. | |
| 2019/0004863 A1 | 1/2019 | Mainali et al. | |
| 2019/0050296 A1 | 2/2019 | Luo et al. | |
| 2019/0102256 A1 | 4/2019 | Murphy | |
| 2019/0196885 A1 | 6/2019 | Song et al. | |
| 2019/0207929 A1 | 7/2019 | Koorapati et al. | |
| 2019/0213175 A1 | 7/2019 | Kong et al. | |
| 2019/0213179 A1 | 7/2019 | McHugh et al. | |
| 2019/0227713 A1 | 7/2019 | Parthasarathy | |
| 2019/0243547 A1 | 8/2019 | Duggal et al. | |
| 2019/0286465 A1 | 9/2019 | Cui et al. | |

(56) References Cited

U.S. PATENT DOCUMENTS

| | | | |
|---|---|---|---|
| 2019/0324874 | A1 | 10/2019 | Gill et al. |
| 2019/0354544 | A1 | 11/2019 | Hertz et al. |
| 2019/0370043 | A1 | 12/2019 | Olderdissen |
| 2019/0370362 | A1 | 12/2019 | Mainali et al. |
| 2019/0384678 | A1 | 12/2019 | Samprathi et al. |
| 2019/0391843 | A1 | 12/2019 | Franciosi et al. |
| 2020/0004570 | A1 | 1/2020 | Glade et al. |
| 2020/0036787 | A1 | 1/2020 | Gupta et al. |
| 2020/0042364 | A1 | 2/2020 | Kumar Shimoga Manjunatha et al. |
| 2020/0104222 | A1 | 4/2020 | Ramamoorthi et al. |
| 2020/0117637 | A1 | 4/2020 | Roy et al. |
| 2020/0195743 | A1 | 6/2020 | Jiang et al. |
| 2020/0201724 | A1 | 6/2020 | Saito et al. |
| 2020/0250044 | A1 | 8/2020 | Sharma et al. |
| 2020/0310859 | A1 | 10/2020 | Gupta et al. |
| 2020/0310915 | A1 | 10/2020 | Alluboyina et al. |
| 2020/0310980 | A1* | 10/2020 | Gupta .................. G06F 3/0649 |
| 2020/0311116 | A1 | 10/2020 | Anvaripour et al. |
| 2020/0314174 | A1 | 10/2020 | Dailianas et al. |
| 2020/0319909 | A1 | 10/2020 | Jawahar et al. |
| 2020/0326876 | A1* | 10/2020 | Tian ..................... G06F 3/0653 |
| 2020/0387510 | A1 | 12/2020 | Ransil et al. |
| 2020/0394078 | A1 | 12/2020 | Taneja et al. |
| 2021/0026661 | A1 | 1/2021 | Sulcer et al. |
| 2021/0034350 | A1 | 2/2021 | Chen et al. |
| 2021/0064585 | A1 | 3/2021 | Chen |
| 2021/0072917 | A1* | 3/2021 | Surla ..................... G06F 3/0683 |
| 2021/0124651 | A1 | 4/2021 | Srinivasan et al. |
| 2021/0181962 | A1 | 6/2021 | Dai et al. |
| 2021/0294499 | A1 | 9/2021 | Wang et al. |
| 2021/0406224 | A1* | 12/2021 | Neufeld .............. H04L 67/1097 |
| 2022/0067011 | A1 | 3/2022 | Yue et al. |

FOREIGN PATENT DOCUMENTS

| | | |
|---|---|---|
| WO | WO-2020/146043 A1 | 7/2020 |
| WO | WO-2021/119546 A1 | 6/2021 |
| WO | WO-2021/232109 A1 | 11/2021 |

OTHER PUBLICATIONS

"Adding objects to versioning-enabled buckets—Amazon Simple Storage Service.pdf," https://docs.aws.amazon.com/AmazonS3/latest/userguide/AddingObjectstoVersioningEnabledBuckets.html, pp. 1-2.

"AWS Pricing"; Amazon Web Services; https://aws.amazon.com/pricing/; Webpage accessed on Jun. 23, 2021; pp. 1-9.

"Cloud & Hosting Services—Building a Cloud Infrastructure"; NetApp; https://www.netapp.com/hybrid-cloud/service-provider-infrastructure/; webpage accessed on Jun. 23, 2021; pp. 1-11.

"Configure a Pod to Use a ConfigMap", from https://kubernetes.io/docs/tasks/configure-pod-container/configure-pod-configmap/,(Oct. 2, 2019).

"Creating an NFS file share"; AWS Storage Gateway—User Guide; https://docs.aws.amazon.com/storagegateway/latest/userguide/CreatingAnNFSFileShare.html; webpage accessed on Oct. 28, 2020; pp. 1-10.

"Deployments", from https://kubernetes.io/docs/concepts/workloads/controllers/deployment/, (Oct. 2, 2019).

"How to use Indexing to Improve Database Queries," https://dataschool.com/sql-optimization/how-indexing-works/, pp. 1-12.

"IT Service Provider Technology Solutions and Services"; HPE—Hewlett Packard; https://www.hpe.com/us/en/solutions/service-providers.html?parentPage=/us/en/solutions/service-providers; Webpage accessed on Jun. 23, 2021; pp. 1-6.

"Managed VMware Cloud Services"; VMware; https://cloud.vmware.com/providers/managed-services-provider; Webpage accessed on Jun. 23, 2021; pp. 1-5.

"Managing your storage lifecycle"; Amazon Simple Storage Service; https://docs.aws.amazon.com/AmazonS3/latest/userguide/object-lifecycle-mgmt.html; webpage accessed on Jun. 18, 2021; pp. 1-2.

"Method:disks.get|Compute Engine Documentation|Google Cloud.pdf," https://cloud.google.com/compute/docs/reference/rest/v1/disks/get, pp. 1-17.

"NetApp ONTAP 9.7 Announced—StorageReview.com," (Jun. 14, 2019), https://www.peakresources.com/netapp-ontap-9-6-release-notes-and-thoughts/, pp. 1-5.

"Nutanix Solution for Service Providers"; Nutanix, Inc. Solution Brief; https://aemstage.nutanix.cn/viewer?type=pdf&path=/content/dam/nutanix/resources/solution-briefs/sb-service-provider-solution-brief.pdf&icid=67VMYKPR6K6O; 2020; pp. 1-3.

"Per Virtual Machine Licensing"; VMware Per VM Pricing & Licensing Help; https://www.vmware.com/support/support-resources/licensing/per-vm.html; Webpage accessed on Jun. 23, 2021; pp. 1-7.

"PUT Object|Cloud Storage|Google Cloud," https://cloud.google.com/storage/docs/XML-api/put-object, pp. 1-3.

"Retrieving object versions from a versioning-enabled bucket—Amazon Simple Storage Service.pdf," https://docs.aws.amazon.com/AmazonS3/latest/userguide/RetrievingObjectVersions.html, pp. 1-3.

"Retrieving Object Versions", from https://docs.aws.amazon.com/AmazonS3/latest/dev/RetrievingObjectVersions.html, (Oct. 2, 2019).

"Set up Cluster Federation with Kubefed—Kubernetes", from https://v1-14.docs.kubernetes.io/docs/tasks/federation/set-up-cluster-federation-kubefed/, (Apr. 17, 2020).

"Storage Tiering"; Vmware Docs; https://docs.vmware.com/en/VMware-Validated-Design/5.0/com.vmware.vvd.sddc-design.doc/GUID-20D2BC02-4500-462F-A353-F9B613CC07AC.html; webpage accessed on Jun. 18, 2021; pp. 1-3.

"SwiftOnFile"; Object Storage-Gluster Docs; v: release3.7.0beta1; https://staged-gluster-docs.readthedocs.io/en/release3.7.0beta1/Administrator%20Guide/Object%20Storage/; webpage accessed on Oct. 28, 2020; pp. 1-2.

"Transitioning objects using Amazon S3 Lifecycle"; Amazon Simple Storage Service; https://docs.aws.amazon.com/AmazonS3/latest/userguide/lifecycle-transition-general-considerations.html; Webpage was accessed on Jun. 18, 2021; pp. 1-5.

"Using Amazon S3 storage classes"; Amazon Simple Storage Service; https://docs.aws.amazon.com/AmazonS3/latest/userguide/storage-class-intro.html; Webpage accessed on Jun. 16, 2021; pp. 1-6.

"Volumes", from https://kubernetes.io/docs/concepts/storage/volumes/, (Oct. 2, 2019).

"Xml and More: OCI?Knowing Object Storage Basics" (Jan. 13, 2019), http://xmlandmore.blogspot.com/2019/01/ociknowing-object-storage-basics.html, pp. 1-6.

Amazon S3, "Retrieving object versions from a versioning-enabled bucket," https://docs.aws.amazon.com/AmazonS3/latest/userguide/RetrievingObjectVersions.html.

Amazon Simple Storage Service User Guide API Version Mar. 1, 2006 (Year: 2006).

B Tree Indexes. http://web.csulb.edu/-amonge/classes/common/db/B TreeIndexes.html, Aug. 4, 2018, pp. 1-7 (2018).

Ballard, Brit, "Back to Basics: Writing SQL Queries," (Apr. 21, 2014), https://thoughtbot.com/blog/back-to-basics-sql, 1-17 pages.

Cano, Ignacio, et al. "Curator: Self-Managing Storage for Enterprise Clusters" (Mar. 27, 2017), from https://www.usenix.org/conference/nsdi17/.

Dellemc, "Elastic Cloud Storage (ECS)," (Aug. 2017), https://repository.usc.edu/sites/repository.usc.edu/files/ecs_overview.pdf. pages 1-57.

Dubinsky Leon, "Behind the scenes of Cloud Spanner's ExecuteQuery request|Google Cloud Blog," (Jan. 7, 2021), https://cloud.google.com/blog/topics/developers-practitioners/behind-the-scenes-of-cloud-spanners-executequery-request, pp. 1-7.

F5, "Enable Single Namespace for VMware Horizon with View Deployments," https://www.f5.com/pdf/solution-center/vmware-single-namespace-overview.pdf, pp. 1-2.

FireEye, "Building Scalable and Responsive Big Data Interfaces with AWS Lambda | AWS Big Data Blog," (Jul. 10, 2015), https://aws.amazon.com/blogs/big-data/building-scalable-and-responsive-big-data-interfaces-with-aws-lambda/, pp. 1-10.

Foreign Search Report on EP 21210465.7 Dtd Apr. 14, 2022.

Foreign Search Report on EP 21210465.7 Dtd Apr. 7, 2022.

(56) References Cited

OTHER PUBLICATIONS

Gowri Balasubramanian; "Should Your DynamoDB Table Be Normalized or Denormalized?"; AWS Database Blog; https://aws.amazon.com/blogs/database/should-your-dynamodb-table-be-normalized-or-denormalized/; Dec.-May 2016; pp. 1-5.
Guess A.R., "Cloudian HyperStore 7 Multi-Cloud Data Management Unifies Public Cloud and On-Premises Storage—Dataversity," (Jan. 29, 2018), https://www.dataversity.net/cloudian-hyperstore-7-multi-cloud-data-management-unifies-public-cloud-premises-storage/, pp. 1-4.
Luis Ayuso; "How to Report Monthly Usage with the Flex Pricing Model"; VMware Cloud Provider Blog; May 20, 2019; pp. 1-6.
Luis Ayuso; "How to Sign Up for the new VCPP Flex Pricing Model"; VMware Cloud Provider Blog; May 20, 2019; pp. 1-6.
Luis Ayuso; "New VCPP Pricing Model Simplifies Delivering Services"; VMware Cloud Provider Blog; May 20, 2019; pp. 1-6.
Michael Bose; "A Guide on How to Mount Amazon S3 as a Drive for Cloud File Sharing"; Nakivo Blog-Cloud-Backup to Cloud; https://www.nakivo.com/blog/mount-amazon-s3-as-a-drive-how-to-guide/; Published Jun. 17, 2020; pp. 1-27.
Mike Deck; "Building and Maintaining an Amazon S3 Metadata Index without Servers"; AWS Big Data Blog; https://aws.amazon.com/blogs/big-data/building-and-maintaining-an-amazon-s3-metadata-index-without-servers/; Aug.-Dec. 2015; pp. 1-6.
NetApp, "A Unified Platform for Cloud Storage Infrastructure," (Oct. 26, 2020), https://cloud.netapp.com/blog/cvo-blg-one-unified-platform-for-cloud-storage-infrastructure-and-data-services, pp. 1-8.
NetApp, "StorageGRID Solves Your Unstructured Data Management Problems|NetApp Blog," (Apr. 17, 2019), https://www.netapp.com/blog/storagegrid-solves-your-unstructured-data-management-problems/, pp. 1-6.
Oracle Multimedia User's Guide, 12c Release 1 (12.1), E17697-09 Jul. 2014 (Year 2014).
Oracle SQL Developer User's Guide, Release 1.5, E12152-08, Jul. 2014 (Year: 2014); pp. 1-128.
Patel Kiran, Goynes Eddie, "Lower latency with AWS Elemental MediaStore chunked object transfer|AWS Media Blog," (Jul. 2, 2019), https://aws.amazon.com/blogs/media/lower-latency-with-aws-elemental-mediastore-chunked-object-transfer/, pp. 1-6.
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Pritchard, Stephen, "Object Storage: On Prem, in the cloud and hybrid," (Sep. 27, 2018), https://www.computerweekly.com/news/252449283/Object-storage-On-prem-in-the-cloud-and-hybrid, pp. 1-8.
Rupprecht Lukas, Zhangz Rui, Owen Bill, Pietzuch Peter, Hildebrandz Dean, "SwiftAnalytics: Optimizing Object Storage for Big Data Analytics," https://lsds.doc.ic.ac.uk/sites/default/files/swift-analytics_ic2e17_crv.pdf, pp. 1-7.
Sonobuoy Overview, https://sonobuoy.io/docs/v0.56.10/.
Sonobuoy, "Sonobuoy," https://sonobuoy.io/, 1-6 pages.
Stopford. Log Structured Merge Trees. http://www.benstopford.com/2015/02/14/ log-structured-merge-trees, 2015, pp. 1-8 (2015).
The Nutanix Bible; from https://nutanixbible.com/; accessed on Jan. 12, 2016.
The Nutanix Bible; from https://nutanixbible.com/; accessed on Jun. 25, 2018.
The Nutanix Bible; from https://nutanixbible.com/; accessed on Jan. 3, 2017.
The Nutanix Bible; from https://nutanixbible.com/; accessed on Jan. 3, 2018.
The Nutanix Bible; from https://nutanixbible.com/; accessed on Sep. 4, 2015.
The Nutanix Bible; from https://nutanixbible.com/; accessed on Jan. 8, 2019.
The Nutanix Bible; from https://nutanixbible.com/; accessed on Jun. 8, 2017.
The Nutanix Bible; from https://nutanixbible.com/; accessed on Jun. 9, 2016.
VM ware, "VMware Cloud Director Object Storage Extension Documentation.pdf," https://docs.vmware.com/en/VMware-Cloud-Director-Object-Storage-Extension/index.html, pp. 1-3.
VMware, "Introducing HCX Enterprise—Cloud Blog—VMware," (Aug. 8, 2019), https://blogs.vmware.com/cloud/2019/08/08/introducing-hcx-enterprise/, pp. 1-6.
VMware, "VMware HCX Enterprise: Non-vSphere to vSphere Workload Migration—Cloud Blog—VMware," (Aug. 8, 2019), https://blogs.vmware.com/cloud/2019/08/08/vmware-hcx-enterprise-non-vsphere-vsphere-workload-migration/, pp. 1-7.
VMware, "VMware Object Storage Interoperability Service-Development Guide," (Sep. 2021), https://www.vmware.com/content/dam/digitalmarketing/vmware/en/pdf/docs/vmware-object-storage-interoperability-service-development-guide.pdf, pp. 1-19.
Wambler, Choosing a Primary Key: Natural or Surrogate? http://www.agiledata.org/essays/keys.html, 2018, pp. 1-4 (2018).
Wikipedia, "Chunked transfer encoding," https://en.wikipedia.org/wiki/Chunked_transfer_encoding, pp. 1-4/.
Woodward Liz, "What Is Elastic Cloud Storage—A Guide to ECS in 2022," https://www.cloudwards.net/what-is-elastic-cloud-storage/, pp. 1-8.
"Choosing a load balancer for your object storage environment", NetApp 2020.
"NetApp StorageGRID", NetApp 2022.
"Tutorial: Transferring data from on-premises storage to Amazon S3 in a different AWS account", https://docs.aws.amazon.com/datasync/latest/userguide/s3-cross-account-transfer.html, accessed Dec. 12, 2022.
"What is AWS Data Sync?", https://docs.aws.amazon.com/datasync/latest/userguide/what-is-datasync.html, accessed Dec. 12, 2022.
Amazon, "Copy your data between on premises object storage and AWS using AWS DataSync", Jul. 27, 2020, https://aws.amazon.com/about-aws/whats-new/2020/07/copy-your-data-between-on-premises-object-storage-and-aws-using-aws-datasync/.
Cloudian, "HyperBalance Load Balancer", https://cloudian.com/products/hyperbalance/, accessed Dec. 12, 2022.
Cloudian, "On-Premises Object Storage: Building S3 in Your Backyard", https://cloudian.com/guides/hybrid-it/on-premises-object-storage/, accessed Dec. 12, 2022.
Cloudian, "S3 Backup: The Complete Guide", https://cloudian.com/blog/s3-backup-the-complete-guide/, accessed Dec. 12, 2022.
Cloudian, "Simple, Secure, Scalable. S3-Compatible, Cloud Native Data Management", https://cloudian.com/products/hyperstore/, accessed Dec. 12, 2022.
NetApp, "StorageGRID: Smart, fast, future-proof object storage", https://www.netapp.com/data-storage/storagegrid/, accessed Dec. 12, 2022.
OpenStack. Openstack Object Storage API V1 Reference—API V1 .<https://docs.huinoo.com/openstack/archive/api/openstack-object-storage/1.0/os-objectstorage-devguide-1.0.pdf>.2014. (Year: 2014).
Rivkind, Yael. Object Storage: Everything You Need To Know. <https://lakefs.io/blog/object-storage/>Nov. 25, 2020. (Year: 2020).
Foreign Search Report on EP dated Feb. 14, 2024.
Final Office Action on U.S. Appl. No. 17/358,967 Dtd Feb. 22, 2023.

* cited by examiner

600

Copy, from a source object to a destination object, a location identifier identifying a location of a region in which the source object is stored
605

Copy, from the source object to the destination object, object metadata using the location identifier
610

700

705 Create a global region that is associated with multiple bucket partitions

710 Provide, to the global region, region information of a source region in which a source object

715 Create a destination region in which a destination object is stored

720 Provide, to the destination region, from the global region, the region information of the source region

FIG. 7

SYSTEM AND METHOD FOR SHALLOW COPY

PRIORITY CLAIM

This application claims priority to U.S. Provisional Application No. 63/282,094, filed Nov. 22, 2021, which application is hereby incorporated by reference in its entirety.

BACKGROUND

In some embodiments, an object store is an internet-scale, high-performance storage platform that offers reliable and cost-efficient data durability. The object store can store an unlimited amount of unstructured data of any content type, including analytic data and rich content, like images and videos.

SUMMARY

Aspects of the present disclosure relate generally to a computing environment, and more particularly to a system and method for performing a shallow copy.

An illustrative embodiment disclosed herein is an apparatus including a processor having programmed instructions to create a global region that is associated with a first bucket partition and a second bucket partition different from the first bucket partition, provide, to the global region, region information of a source region in which a source object is stored, create a destination region in which a destination object is stored, and provide, to the destination region, from the global region, the region information of the source region. In some embodiments, the source region is in the first bucket partition and the destination region is in the second bucket partition.

In some embodiments, the programmed instructions further cause the processor to copy, from the source object to the destination object, object metadata using the region information of the source region. In some embodiments, the region information of the source region includes a bucket identifier, a partition identifier, and a region identifier. In some embodiments, the programmed instructions further cause the processor to determine that the destination region is in a different partition than the partition of the source region, and create the global region in response to determining that the destination region is in the different partition than the partition of the source region. In some embodiments, providing, to the global region, the region information of the source region includes creating a pointer pointing from the global region to the source region, and providing, to the destination region, from the global region, the region information of the source region includes creating a pointer pointing from the destination region to the global region. In some embodiments, the programmed instructions further cause the processor to determine that the global region points to the source region in response to deletion of the source object in the source region, and, based on the determination, preserve the source region, such that a memory of the source region is not reclaimed. In some embodiments, the region information of the source region includes a physical disk location.

Another illustrative embodiment disclosed herein is a non-transitory computer readable storage medium including instructions stored thereon that, when executed by a processor, cause the processor to create a global region that is associated with a first bucket partition and a second bucket partition different from the first bucket partition, provide, to the global region, region information of a source region in which a source object is stored, create a destination region in which a destination object is stored, and provide, to the destination region, from the global region, the region information of the source region. In some embodiments, the source region is in the first bucket partition and the destination region is in the second bucket partition.

In some embodiments, the programmed instructions further cause the processor to copy, from the source object to the destination object, object metadata using the region information of the source region. In some embodiments, the region information of the source region includes a bucket identifier, a partition identifier, and a region identifier. In some embodiments, the programmed instructions further cause the processor to determine that the destination region is in a different partition than the partition of the source region, and create the global region in response to determining that the destination region is in the different partition than the partition of the source region. In some embodiments, providing, to the global region, the region information of the source region includes creating a pointer pointing from the global region to the source region, and providing, to the destination region, from the global region, the region information of the source region includes creating a pointer pointing from the destination region to the global region. In some embodiments, the programmed instructions further cause the processor to determine that the global region points to the source region in response to deletion of the source object in the source region, and, based on the determination, preserve the source region, such that a memory of the source region is not reclaimed. In some embodiments, the region information of the source region includes a physical disk location.

Another illustrative embodiment disclosed herein is a method including creating a global region that is associated with a first bucket partition and a second bucket partition different from the first bucket partition, providing, to the global region, region information of a source region in which a source object is stored, creating a destination region in which a destination object is stored, and providing, to the destination region, from the global region, the region information of the source region. In some embodiments, the source region is in the first bucket partition and the destination region is in the second bucket partition.

In some embodiments, the method includes causing the processor to copy, from the source object to the destination object, object metadata using the region information of the source region. In some embodiments, the region information of the source region includes a bucket identifier, a partition identifier, and a region identifier. In some embodiments, the method includes determining that the destination region is in a different partition than the partition of the source region, and creating the global region in response to determining that the destination region is in the different partition than the partition of the source region. In some embodiments, providing, to the global region, the region information of the source region includes creating a pointer pointing from the global region to the source region, and providing, to the destination region, from the global region, the region information of the source region includes creating a pointer pointing from the destination region to the global region. In some embodiments, the method includes determining that the global region points to the source region in response to deletion of the source object in the source region, and, based on the determination, preserving the source region, such that a memory of the source region is not reclaimed. In some embodiments, the region information of the source region includes a physical disk location.

Further details of aspects, objects, and advantages of the disclosure are described below in the detailed description, drawings, and claims. Both the foregoing general description and the following detailed description are exemplary and explanatory, and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 7 is an example method for performing the second type of shallow copy, in accordance with some embodiments of the present disclosure.

Figure 1:
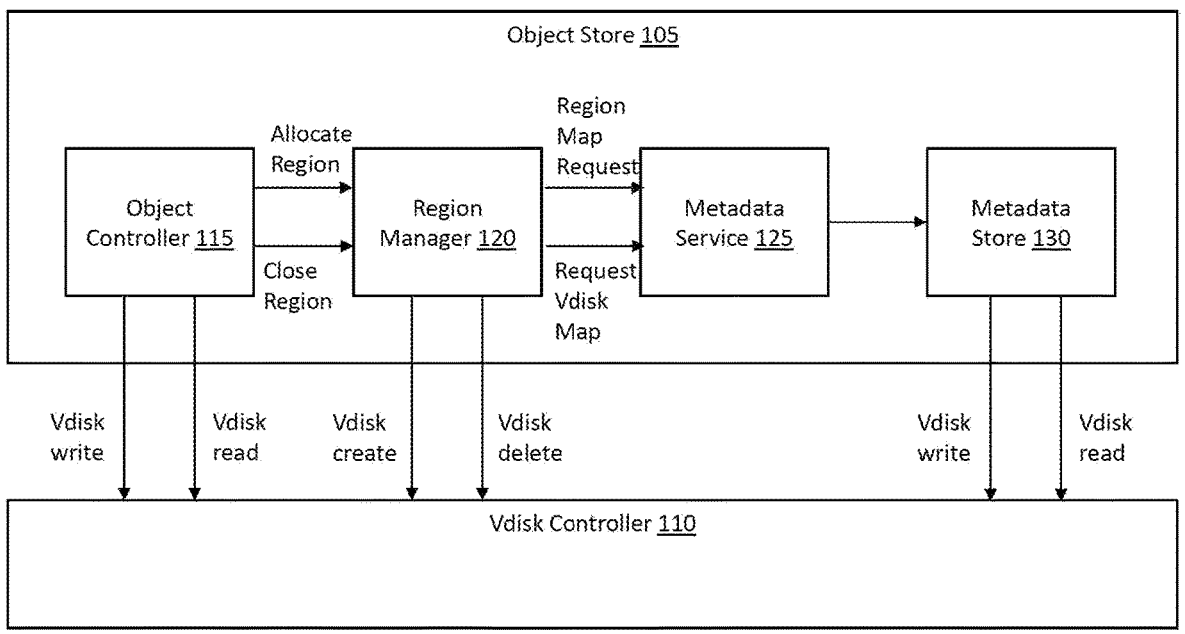
FIG. 1 illustrates an example block diagram of an object store environment, in accordance with some embodiments.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

In some embodiments lacking the improvements disclosed herein, a copy object application programming interface (API) is implemented as a deep object copy, meaning that the underlying object data is copied. A deep copy can be an inefficient copy mechanism that wastes a significant amount of cluster throughput, especially when copying large objects. In particular, deep copies can be costly with Hadoop workloads or any legacy application that might use file system "move" semantics. What is needed is to perform a shallow copy, which is a metadata-only copy, to improve copy workflow latency and avoid unnecessarily consuming additional storage.

Disclosed herein are embodiments of a system and method for performing a shallow copy of an object. In some embodiments, a region location is copied from a source object to a destination object. Advantageously, object data of the source object need not be copied. The shallow copy speeds up copy time and reduces an amount of storage consumed. In some embodiments, in translating file system operations to object storage operations, such as translating a move operation to a copy operation and a delete operation, the shallow copy can be used to implement the copy operation. In some embodiments, the shallow copy can be used to implement a native object copy operation. Additionally, shallow copying can be applied to composable objects.

In some embodiments, objects are partitioned into different bucket partitions. Each bucket partition has its own garbage collection workflow. In some embodiments lacking the improvements disclosed herein, implementing shallow copies across bucket partitions results in the underlying object data being deleted after garbage collection is performed on the reference bucket partition. After the underlying object data is deleted, the destination object can be left with dangling pointers and no underlying object data to point to. What is needed is a shallow copy implementation that does not result in deletions of the underlying object data or dangling pointers.

Disclosed herein are embodiments of a system and method for performing a shallow copy of an object across bucket partitions. In some embodiments, a global region is created that is associated with multiple bucket portions. In some embodiments, the global region points to the source region in the source bucket partition. In some embodiments, a destination region in the destination bucket partition is created that points to the global region. In some embodiments, via the global region, the source object can be copied to the destination object using source region information provided via the global region. Advantageously, embodiments of the system and method are compliant with the metadata being separated by bucket partitions and allow for cross reference across partitions without permitting dangling pointers or expensive data copies.

FIG. 1 illustrates an example block diagram of an object store environment 100, in accordance with some embodiments. The object store environment 100 includes an object store 105. The object store 105 can be referred to as an object storage platform. The object store 105 can store objects. An object can be composed of the object itself (e.g., object data) and metadata about the object (e.g., object metadata). An object can include unstructured data. An object can include immutable data. The object store 105 can include buckets which are logical constructs where the objects are stored. Each bucket can be associated with a single set of resources. Each bucket can be associated with a single set of policies. The buckets can be backed by virtual disks (vdisks). The vdisks can be partitioned into regions. The object data can be stored in a region.

The object store 105 can have a flat hierarchy (e.g., no directory, sub-folders, or sub-buckets). The object store 105 can have a single namespace or a unique namespace for each of multiple tenants (e.g., users). Objects can be managed using a representational state transfer (RESTful) application programming interface (API) build on hypertext transfer protocol (HTTP) verbs (e.g., standard HTTP verbs such as GET, PUT, DELETE). Users can define object names when they upload an object. The object store 105 can prepend an object store namespace string and a bucket name to the object name. A directory structure can be simulated by adding a prefix string that includes a forward slash.

In some embodiments, the object store environment 100 includes the object store 105 and a vdisk controller 110 coupled to the object store 105. The vdisk controller 110 can be executed in a hypervisor that virtualizes resources of one or more nodes (e.g., hosts, machines, servers, storage nodes, hyperconverged nodes, etc.). The vdisk controller 110 can be executed in user space or kernel space of the hypervisor. The vdisk controller 110 can be executed in a virtual machine or container. In some embodiments, the object store 105 includes an object controller 115, a region manager 120, a metadata service 125, and a metadata store 130.

The object controller 115 may include a processor having programmed instructions (hereinafter, the object controller 115 may include programmed instructions) to receive and serve object requests from a client, including requests to create, read, write, and delete. The object controller 115 may serve object requests corresponding to multiple buckets or bucket partitions. The client object request may be in accordance with REST API protocol. The client object request may include parameters associated with the object such as an object identifier, a bucket identifier, and/or a bucket partition identifier.

The object controller 115 may include programmed instructions to store any object data associated with the client request in memory. The memory may on the node that is hosting the object controller 115. The memory may be physical or virtual. In some embodiments, the object controller 115 maintains a checksum for the object data. In some embodiments, the object controller 115 computes an MD5sum of the data.

The object controller 115 may include programmed instructions to send a request to the region manager 120 to allocate a region (e.g. a space/portion/chunk of one or more vdisks) to a bucket. The allocated region may be allocated for writing and reading objects of the bucket. Responsive to the region manager 120 allocating the region to the bucket, an endpoint vdisk controller, such as the vdisk controller 110, or a component thereof, may include programmed instructions to write to and read from the region. The object controller 115 may include programmed instructions to send a request to the region manager 120 to receive an identifier of (and/or identifier of a node associated with) the endpoint vdisk controller for requesting vdisk reads and vdisk writes.

Once the endpoint vdisk controller is determined, the object controller 115 may include programmed instructions to send a request to the endpoint vdisk controller. The endpoint vdisk controller may be the vdisk controller that hosts the vdisk. The request may include a request to open the vdisk, to read an object from the vdisk, and/or to write an object to the vdisk. In some embodiments, the object controller 115 populates metadata associated with the object and writes the metadata to a metadata server (e.g. the metadata service 125 and/or the metadata store 130). The metadata may include an object identifier, a bucket identifier, a region identifier, a partition identifier, an object handle, an object key, an object key-value pair, a life-cycle policy, a retention policy, other object or region attributes, a vdisk location and/or identifier, and/or a physical disk location and/or identifier, among others.

The object controller 115 may include programmed instructions to send a second request to the region manager 120 to close the region. Responsive to the region being in a closed state, the endpoint vdisk controller may deny further write requests from the object controller 115. The object controller 115 may include programmed instructions to request vdisk reads of closed vdisks from a second vdisk controller, for example, through a proxy vdisk controller on the second vdisk controller.

The region manager 120 may include a processor having programmed instructions (hereinafter, the region manager 120 may include programmed instructions) to manage region allocations for a cluster of one or more vdisks. The region manager 120 may include programmed instructions to load balance vdisk allocations across vdisk controllers and region allocations across vdisks. The region manager 120 may include programmed instructions to provide APIs for region allocation to the object controller 115.

In some embodiments, the region manager 120 runs as a part of a metadata service acting in a master slave model where all the region allocations and vdisk allocations are handled centrally by the master. The object controller 115 may issue remote procedure calls (RPCs) to the region manager 120 to perform a region allocation. In some embodiments, the region manager 120 runs inside an object store 105 process. In some embodiments, region manager 120 running inside the object store 105 process handles vdisk allocations and region allocations for the object store 105 locally.

The metadata service 125 may include a processor having programmed instructions (hereinafter, the metadata service 125 may include programmed instructions) to serve requests for looking up/reading) or writing (e.g., updating) metadata associated with an object read request or an object write request from the object controller 115, respectively. The metadata service 125 may be assigned to metadata of objects that reside in a subset of buckets or bucket partitions. The metadata service 125 may include programmed instructions to serve the metadata update request by storing the metadata in a data structure in the metadata store 130. The metadata service 125 may include programmed instructions to serve the metadata lookup or update request by looking up or updating a metadata entry that is located at an index in the data structure in the metadata store 130. The index may be a key derived from a hash of one or more object parameters associated with the object. The metadata service 125 may receive from the object controller 115 the index associated with the metadata lookup.

The metadata store 130 is a log-structured-merge (LSM) based key-value store including key-value data structures in memory and/or persistent storage. The data structures may be implemented as indexed arrays including metadata entries and corresponding indices. The indices may be represented numerically or strings. Each metadata entry includes a key-value pair including a key and one or more values. The key may be a hash of an object handle associated with an object whose metadata is stored in the metadata entry. The object handle may include the object identifier, the bucket identifier, the bucket partition identifier, and the like. The data structures may be implemented as separate arrays for each object. The data structures may be implemented as multi-dimensional arrays, where each object is assigned to a row and each version of the object is assigned to a column in that row. In some embodiments, the metadata store 130 stores metadata in persistent storage by sending a request to the vdisk controller 110 to write the metadata to a vdisk. In some embodiments, the metadata store 130 reads metadata from the persistent storage by sending a request to the vdisk controller 110 to read the metadata from the vdisk.

Although one object store 105, one vdisk controller 110, one object controller 115, one region manager 120, one metadata service 125, and one metadata store 130 are shown in the object store environment 100, in other embodiments, greater than any of the one vdisk controller 110, one object controller 115, one region manager 120, one metadata service 125, and one metadata store 130 may be used.

Figure 2:
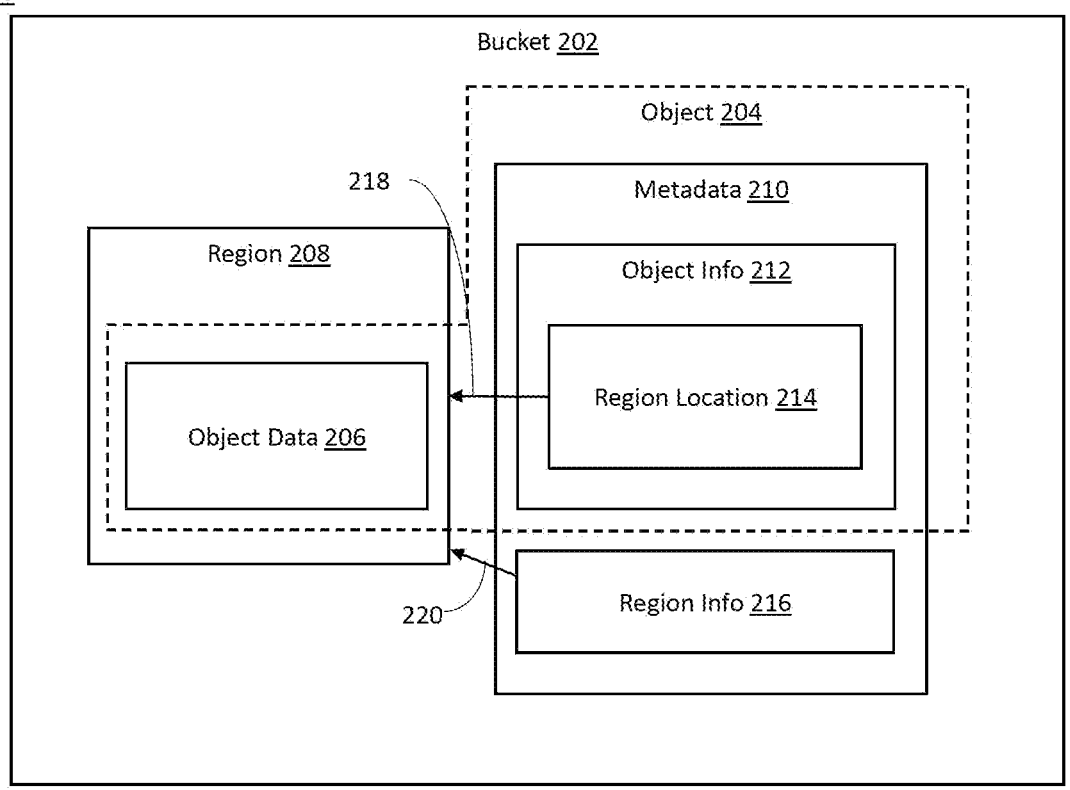
FIG. 2 illustrates an example block diagram of a bucket environment, in accordance with some embodiments of the present disclosure.

FIG. 2 illustrates an example block diagram of a bucket environment 200, in accordance with some embodiments of the present disclosure. The bucket environment 200 includes a bucket 202. In some embodiments, the bucket 202 includes a number of objects 204. In some embodiments, object data 206 is stored in the bucket 202. In some embodiments, the object data 206 of the object 204 is stored in a region 208 of a vdisk and the region 208 is included, or otherwise associated with, the bucket 202.

In some embodiments, the bucket 202 includes metadata 210. In some embodiments, the metadata 210 includes object info 212 (e.g., object metadata) of the object 204. The object info 212 can include attributes of the object data 206. For example, the object info 212 includes region location 214 (e.g., one or more of a partition identifier, a bucket identifier, a region identifier), the object handle, time stamps (e.g., time created, time of expiry), policies (e.g., object life-cycle policy, retention policy), a check sum, permissions, a key (e.g., including a partition identifier, a bucket identifier), a key-value pair, etc. In some embodiments, the region location 214 points to (e.g., identifies, locates, etc.) the region 208, or a portion thereof, as shown with pointer 218. A pointer here can refer to an address or other reference where the data of interest (e.g., the object data 206) can be found. In some embodiments, a location of the object data 206 can be determined from the region location 214. In some embodiments, a garbage collection workflow includes scanning all of the region locations (e.g., the region location 214) in a bucket partition and using the region locations to reclaim space partially or completely from the regions (e.g., the region 208) in that partition. Bucket partitions are further described with respect to FIGS. 3A and 3B.

In some embodiments, the metadata 210 includes region info 216. Region info 216 can include attributes of the region 208. For example, the region info 216 includes one or more attributes of the region location 214, time stamps, policies (e.g., region life-cycle policy, retention policy), a check sum, permissions, etc. In some embodiments, the region info 216 points to the region 208 as shown with pointer 220. In some embodiments, a location of the object data 206 can be determined from the region info 216.

Figure 3A:
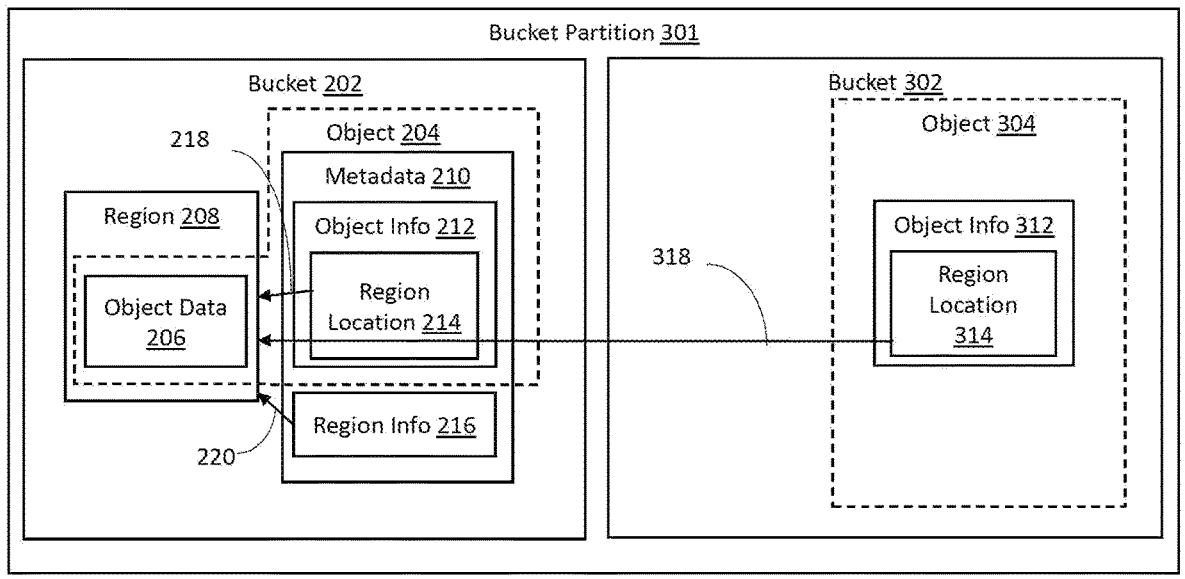
FIG. 3A is an example block diagram of a first type of shallow copy, in accordance with some embodiments of the present disclosure.

FIG. 3A is an example block diagram of an environment 300 for a first type of shallow copy, in accordance with some embodiments of the present disclosure. The environment 300 includes a bucket partition 301. In some embodiments the object metadata (e.g., object info 212) and the region metadata (e.g., region info 216) of any bucket partition such as the bucket partition 301 is self-sufficient within the key-range of that bucket partition. Having self-sufficient bucket partitions can enable a partition-based garbage collection.

The bucket partition 301 includes the bucket 202 of FIG. 2 and a bucket 302 including an object 304. FIG. 3A shows the environment 300 after the object 204 is shallow copied to an object 304. A shallow copy is a copy of metadata such that a destination object (e.g., object 304) references a source object (e.g., object 204). In some embodiments, the object 304 includes a region location 314. The region location 314 can be copied from the region location 214. Thus, the object 304 can be a reference to the object 204. In some embodiments, the region location 314 points to the region 208 as shown with pointer 318. In some embodiments, the object 304 includes object info 312. The object info 312 can be copied from the object info 212 using the region location 314.

Garbage collection is a process in which memory of a region is reclaimed after an object (e.g., object metadata) or its associated region (e.g., region metadata) is deleted. In some embodiments, if object 204 (e.g., object info 212) is deleted, garbage collection is not triggered to reclaim memory of the region 208 since there is a reference in the partition 301 to the region 208.

Figure 3B:
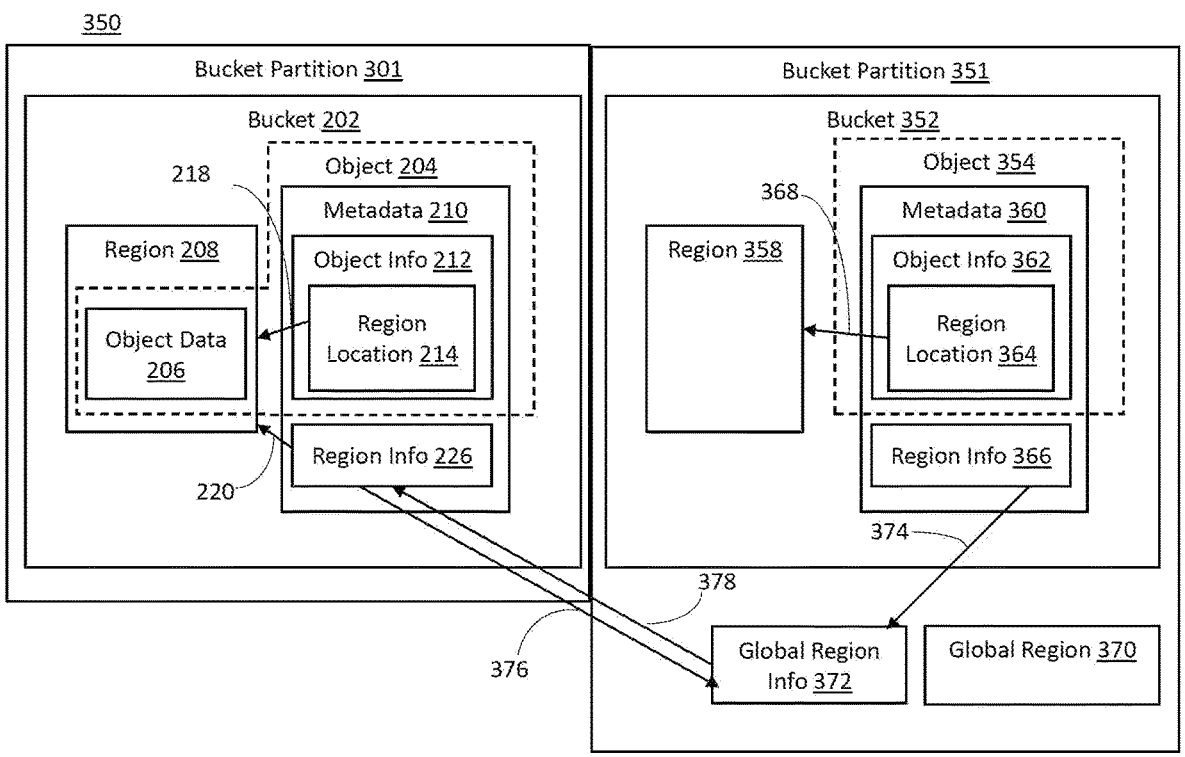
FIG. 3B is an example block diagram of a second type of shallow copy, in accordance with some embodiments of the present disclosure.

FIG. 3B is an example block diagram of an environment 350 for a second type of shallow copy, in accordance with some embodiments of the present disclosure. The environment 300 includes the bucket partition 301 of FIG. 3A and a bucket partition 351. In some embodiments, the bucket partition 351 includes a bucket 352. In some embodiments, the bucket 352 includes a region 358, metadata 360, which includes object info 362 and region info 366. In some embodiments, the region info 366 is associated with the region 358 (e.g., includes attributes of the region 358). In some embodiments, the object info includes a region location 364 that points to the region 358 (see pointer 368).

In some embodiments, the bucket partition 351 includes a global region 370 and global region info 372, which can include attributes of the global region 370. A global region info can be region metadata that isn't associated with any one partition-bucket pair. In some embodiments, the region info 366 associated with the region 358 includes a pointer to the global region info (see pointer 374). In some embodiments, the region info 226 includes a pointer to a global region (see pointer 376). Region info 226 can include region attributes such as life-cycle and retention policies. In some embodiments, the global region info 372 includes a pointer to the region info 226 (see pointer 378). The pointer 378 can be referred to as a back-pointer. Global region info 372 can include metadata that represents physical data locations. Global region info 372 can be stored as a separate column family (e.g., in the metadata store 130) than that of region info 366 or region info 226.

The region info 226 and the region info 366 can be referred to as pointer region info or symlink region info. The region info 226 and the region info 366 can act as proxies for a region in a different partition. In some embodiments, via the pointer represented by 378, the region info 226 can provide a location of the region 208 (e.g., the object data 206) to the global region info 372 and, via the pointer represented by 374, the global region info 372 can provide a location of the region 208 (e.g., the object data 206) to the region info 366. The object info 362 can be copied from the object info 212 using the region info 366.

In some embodiments, if the object 204 is deleted but the object 354 has not yet been deleted, garbage collection is not triggered to reclaim memory of the region 208 since the object store 105 (e.g., the region manager 120 or the object controller 115) can detect that the global region 372 still has at least one reference (e.g., the pointer 374, the region info 366, or a pointer from global region info 372 pointing to the region info 366). Therefore, in some embodiments, the object 354 does not include a dangling pointer. In some embodiments, if the object 204 and the object 354 are deleted, the object store 105 determines that the object data in the region is un-referenced, which can trigger garbage collection to reclaim memory of the region 208. In some embodiments, the garbage collection to reclaims memory of the global region 370. In some embodiments, the garbage collection deletes the pointers (e.g., pointer 374, pointer 376, and/or the pointer 378).

Figure 4:
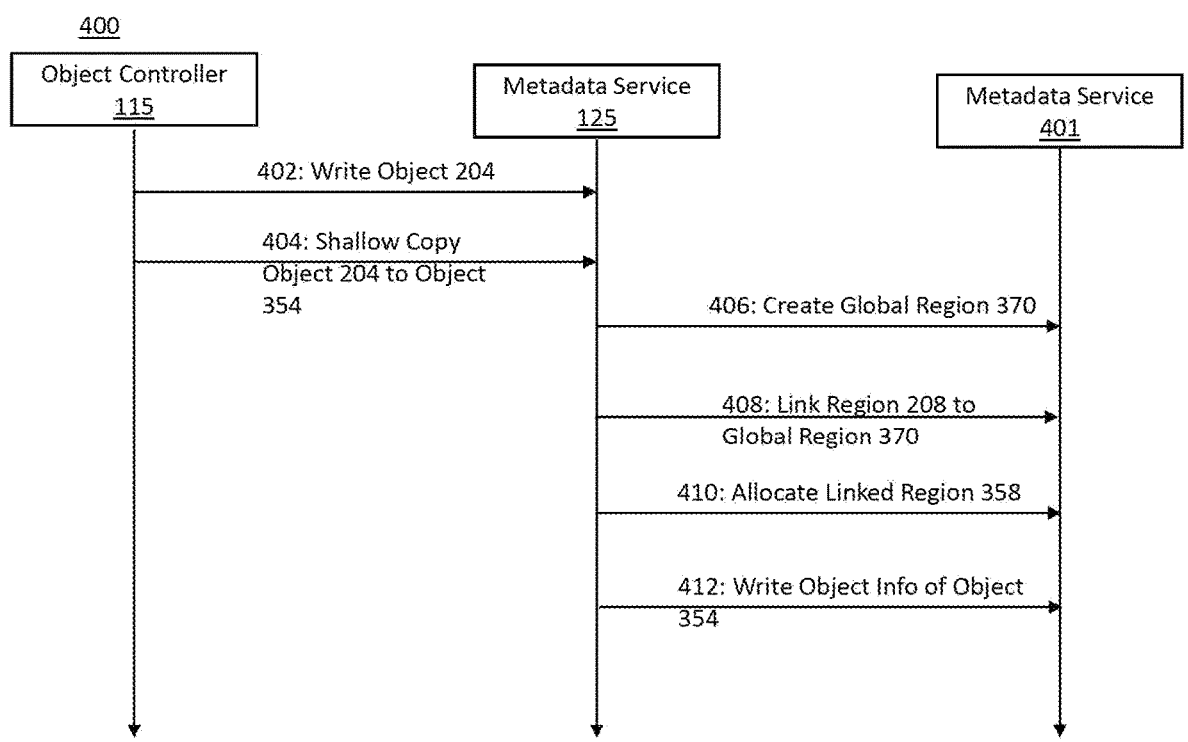
FIG. 4 is an example swim lane diagram of a method for performing the second type of shallow copy, in accordance with some embodiments of the present disclosure.

FIG. 4 is an example swim lane diagram of a method 400 of executing the second type of shallow copy, in accordance with some embodiments of the present disclosure. The method 400 can include additional, fewer, or different operations. In some embodiments, at 402, the object controller 115 (e.g., of the bucket partition 301) sends a request to the metadata service 125 (e.g., of the bucket partition 301) to write object 204. This can trigger creation of metadata entries where metadata such as object info 212 is stored. In some embodiments, at 404, the object controller 115 can send a request to the metadata service 125 to shallow copy object 204 to object 354 located in the bucket partition 351.

In some embodiments, the metadata service 125 grabs a lock of the object 204. This fences (e.g., prevents) any deletes of the object 204. In some embodiments, the metadata service 401 acknowledges and confirms performance of the requested action. In some embodiments, the metadata service 125 looks up the object info 212 to determine that the object 204 is stored in the region 208. In some embodiments, at 406-410, the metadata service 125 facilitates copies/clones region info 226 of the object 204 to preserve object/region metadata locality and avoid dangling pointers.

In some embodiments, at 406, the metadata service 125 sends a request to the metadata service 401 (e.g., of the bucket partition 351) to create a global region 370. In some embodiments, the request is sent/forwarded to a region manager associated with the bucket partition 351. In some embodiments, the metadata service 401 or the region manager acknowledges and confirms performance of the requested action. In some embodiments, the metadata service 125 or the region manager creates an entry in global region info 372 that is a clone of, and having a back-pointer (378) to, the region info 226. In some embodiments the entry in the global region info 372 returns a region identifier. In some embodiments, if an entry of the region info 226 is a pointer 376, the pointer 376 is traversed and returns the global region 370. In some embodiments, the metadata locality of the global region 370 is determined by the region identifier.

In some embodiments, at 408, the metadata service 125 sends a request to the metadata service 401 or the region manager to link the region 208 to the global region 370. In some embodiments, the metadata service 401 or the region manager acknowledges and confirms performance of the requested action. In some embodiments, the metadata service 401 or the region manager converts the region info 216 (e.g., a legacy region info) associated with the region 208 of FIG. 3A into the region info 226 (e.g., a pointer region info) associated with the region 208 of FIG. 3B. At this point, the region 208 (e.g., the region info 226) references the global region 370 (e.g., the global region info 372, see pointer 376).

In some embodiments, at 410, the metadata service 125 sends a request to the metadata service 401 or the region manager to allocate the linked region 358. In some embodiments, the metadata service 401 or the region manager allocates a region identifier and create a region info 366 that includes an entry that points to the global region 370 (e.g., the global region info 372). In some embodiments, the metadata service 401 or the region manager acknowledges and confirms performance of the requested action.

In some embodiments, at 412, the metadata service 125 sends a request to the metadata service 401 to write object info 362 of the object 354. In some embodiments, the metadata service 401 acknowledges and confirms performance of the requested action. In some embodiments, the metadata service 401 writes the object info 362 using the region info 226 (e.g., global region info 372, region info 366, etc.) of the region 208. In some embodiments, the metadata service 401 locates the object info 212 using the region info of the region 208 and copies the object info 212 to the object info 362. In some embodiments, the metadata service 125 acknowledges and confirms performance of the shallow copy to the object controller 115.

Figure 5:
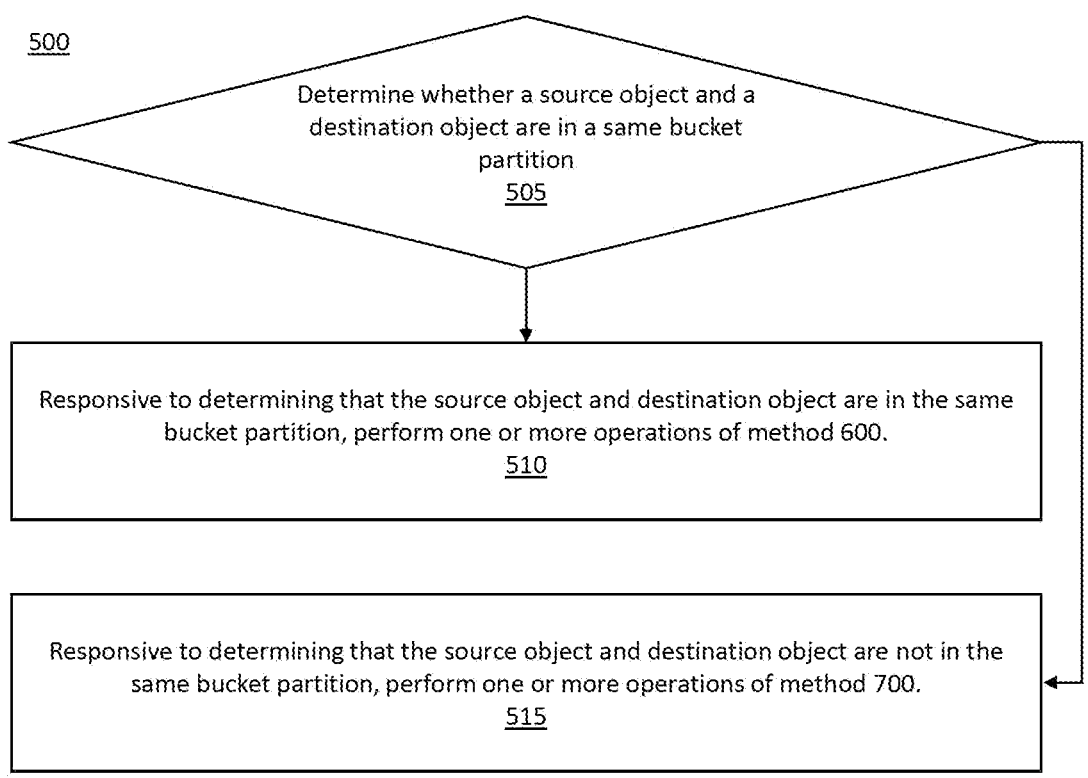
FIG. 5 is an example method for selecting a type of shallow copy, in accordance with some embodiments of the present disclosure.

FIG. 5 is an example method 500 for selecting a type of shallow copy, in accordance with some embodiments of the present disclosure. The method 500 may be implemented using, or performed by one or more of the systems (e.g., the object store environment 100, the bucket environment 200, the environment 200, the environment 300, or the computing device 800), one or more components (e.g., the object store 105, the object controller 115, the region manager 120, the metadata service 125, the metadata service 401, etc.) of one or more of the systems, or a processor associated with one or more of the systems or one or more components. Additional, fewer, or different operations may be performed in the method 500 depending on the embodiment. Additionally, or alternatively, two or more of the blocks of the method 500 may be performed in parallel.

In some embodiments, at operation 505, a processor (e.g., a processor associated with the object store 105) determines whether a source object and a destination object are in a same bucket partition. In some embodiments, at operation 510, responsive to determining that the source object and destination object are in the same bucket partition, the processor performs one or more of the operations of the method 600 described below. In some embodiments, at operation 515, responsive to determining that the source object and destination object are not in the same bucket partition, the processor performs one or more of the operations of the method 700 described below. In some embodiments, the processor determines whether the source object is below a threshold amount of data. In some embodiments, responsive to determining whether the source object is below the threshold amount of data, the processor performs a deep copy.

Figure 6:
FIG. 6 is an example method for performing the first type of shallow copy, in accordance with some embodiments of the present disclosure.

FIG. 6 is an example method for performing the first type of shallow copy, in accordance with some embodiments of the present disclosure. The method 600 may be implemented using, or performed by one or more of the systems (e.g., the object store environment 100, the bucket environment 200, the environment 200, the environment 300, or the computing device 800), one or more components (e.g., the object controller 115, the region manager 120, the metadata service 125, the metadata service 401, etc.) of one or more of the systems, or a processor associated with one or more of the systems or one or more components. Additional, fewer, or different operations may be performed in the method 600 depending on the embodiment. Additionally, or alternatively, two or more of the blocks of the method 600 may be performed in parallel.

In some embodiments, at operation 605, a processor (e.g., a processor associated with the object store 105) copies, from a source object (e.g., object 204) to a destination object (e.g., object 304), a location identifier (e.g., the region location 214) identifying a location of a region in which the source object is stored, wherein the source object and the destination object are in a same bucket partition. In some embodiments, copying the region location 214 generates a region location 314 in the destination object. In some embodiments, the location identifier includes a bucket identifier, a partition identifier, and a region identifier. In some embodiments, at operation 610, the processor copies, from the source object to the destination object, object metadata using the location identifier.

FIG. 7 is an example method for performing the second type of shallow copy, in accordance with some embodiments of the present disclosure. The method 700 may be implemented using, or performed by one or more of the systems (e.g., the object store environment 100, the bucket environment 200, the environment 200, the environment 300, or the computing device 800), one or more components (e.g., the object controller 115, the region manager 120, the metadata service 125, the metadata service 401, etc.) of one or more of the systems, or a processor associated with one or more of the systems or one or more components. Additional, fewer, or different operations may be performed in the method 700 depending on the embodiment. Additionally, or alternatively, two or more of the blocks of the method 700 may be performed in parallel.

In some embodiments, at operation 705, a processor (e.g., a processor associated with the object store 105) creates a global region (e.g., global region 370) that is associated with multiple bucket partitions (e.g., the bucket partitions 301 and 351). In some embodiments, at operation 710, the processor provides, to the global region, region information of (e.g., associated with) a source region (e.g., the region 208) in which a source object (e.g., object 204) is stored. In some embodiments, the region information of the source region includes a bucket identifier, a partition identifier, and a region identifier. In some embodiments, at operation 715, the processor creates a destination region (e.g., region 358) in which a destination object (e.g., object 354) is stored. In some embodiments, the destination region is created in a different (e.g., separate) partition (e.g., partition 351) than a partition (e.g., partition 301) that includes the source region. In some embodiments, at operation 720, the processor provides, to the destination region, from the global region, the region information (e.g., region info 226) of the source region. In some embodiments, the processor copies, from the source object to the destination object, object metadata (e.g., object info 212) using the region information of the source region.

Figure 8:
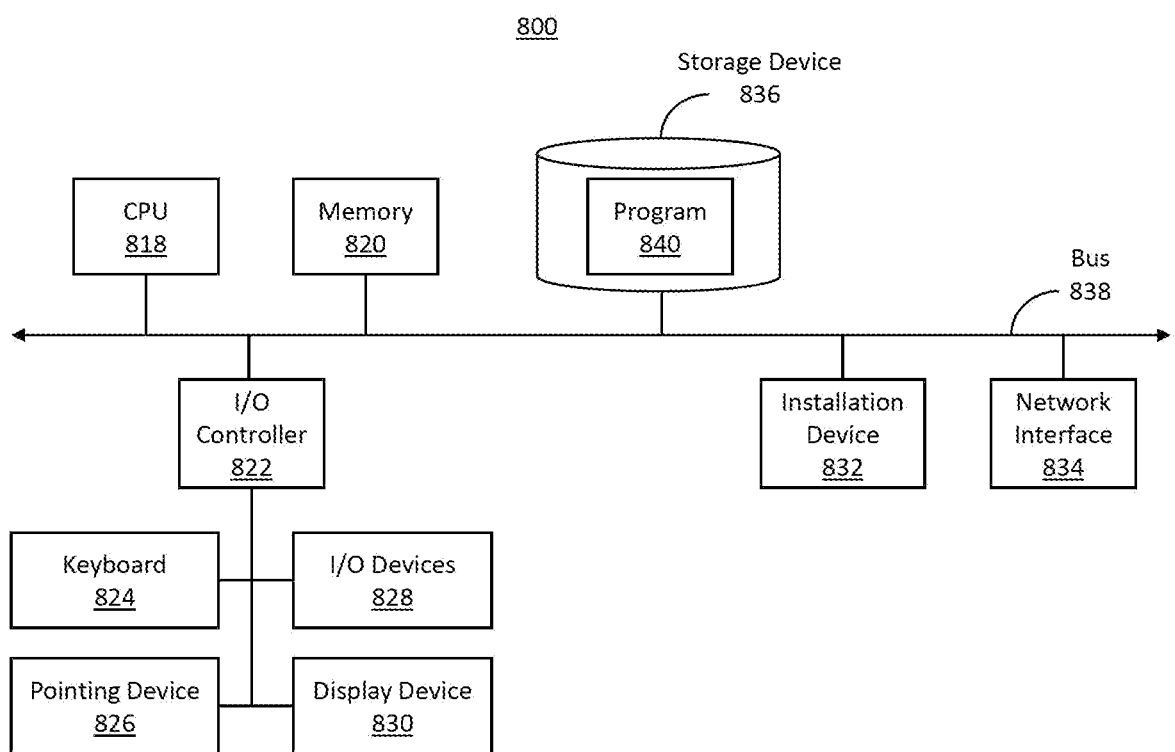
FIG. 8 is a block diagram depicting an implementation of a computing device that can be used in connection with the systems depicted in FIGS. 1, 2, 3A and 3B, and the methods depicted in FIG. 4-7, in accordance with some embodiments of the present disclosure.

FIG. 8 depicts block diagrams of a computing device 800 useful for practicing an embodiment of the object store 105, the object controller 115, the region manager 120, the metadata service 125, the metadata service 401, etc. As shown in FIG. 8, each computing device 800 can include a central processing unit 818, and a main memory unit 820. As shown in FIG. 8, a computing device 800 can include one or more of a storage device 836, an installation device 832, a network interface 834, an I/O controller 822, a display device 830, a keyboard 824 or a pointing device 826, e.g. a mouse. The storage device 836 can include, without limitation, a program 840, such as an operating system, software, or software associated with the object store 105.

The central processing unit 818 is any logic circuitry that responds to and processes instructions fetched from the main memory unit 820. The central processing unit 818 can be provided by a microprocessor unit. The computing device 800 can be based on any of these processors, or any other processor capable of operating as described herein. The central processing unit 818 can utilize instruction level parallelism, thread level parallelism, different levels of cache, and multi-core processors. A multi-core processor can include two or more processing units on a single computing component.

Main memory unit 820 can include one or more memory chips capable of storing data and allowing any storage location to be directly accessed by the microprocessor 818. Main memory unit 820 can be volatile and faster than storage 836 memory. Main memory units 820 can be Dynamic random access memory (DRAM) or any variants, including static random access memory (SRAM). The memory 820 or the storage 836 can be non-volatile; e.g., non-volatile read access memory (NVRAM). The memory 820 can be based on any type of memory chip, or any other available memory chips. In the example depicted in FIG. 8, the processor 818 can communicate with memory 820 via a system bus 838.

A wide variety of I/O devices 828 can be present in the computing device 800. Input devices 828 can include keyboards, mice, trackpads, trackballs, touchpads, touch mice, multi-touch touchpads and touch mice, microphones, multi-array microphones, drawing tablets, cameras, or other sensors. Output devices 828 can include video displays, graphical displays, speakers, headphones, or printers.

I/O devices 828 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 828, display devices 830 or group of devices can be augmented reality devices. The I/O devices can be controlled by an I/O controller 822 as shown in FIG. 8. The I/O controller 822 can control one or more I/O devices, such as, e.g., a keyboard 824 and a pointing device 826, e.g., a mouse or optical pen. Furthermore, an I/O device can also provide storage and/or an installation device 832 for the computing device 800. In embodiments, the computing device 800 can provide USB connections (not shown) to receive handheld USB storage devices. In embodiments, an I/O device 828 can be a bridge between the system bus 838 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 830 can be connected to I/O controller 822. Display devices can include, e.g., liquid crystal displays (LCD), electronic papers (e-ink) displays, flexile displays, light emitting diode displays (LED), or other types of displays. In some embodiments, display devices 830 or the corresponding I/O controllers 822 can be controlled through or have hardware support for OPENGL or DIRECTX API or other graphics libraries. Any of the I/O devices 828 and/or the I/O controller 822 can include any type and/or form of suitable hardware, software, or combination of hardware and software to support, enable or provide for the connection and use of one or more display devices 830 by the computing device 800. For example, the computing device 800 can include any type and/or form of video adapter, video card, driver, and/or library to interface, communicate, connect or otherwise use the display devices 830. In embodiments, a video adapter can include multiple connectors to interface to multiple display devices 830.

The computing device 800 can include a storage device 836 (e.g., one or more hard disk drives or redundant arrays of independent disks) for storing an operating system or other related software, and for storing application software programs such as any program related to the systems, methods, components, modules, elements, or functions depicted in FIG. 1, 2, 3A, or 3B. Examples of storage device 836 include, e.g., hard disk drive (HDD); optical drive including CD drive, DVD drive, or BLU-RAY drive; solid-state drive (SSD); USB flash drive; or any other device suitable for storing data. Storage devices 836 can include multiple volatile and non-volatile memories, including, e.g., solid state hybrid drives that combine hard disks with solid state cache. Storage devices 836 can be non-volatile, mutable, or read-only. Storage devices 836 can be internal and connect to the computing device 800 via a bus 838. Storage device 836 can be external and connect to the computing device 800 via an I/O device 828 that provides an external bus. Storage device 836 can connect to the computing device 800 via the network interface 834 over a network. Some client devices may not require a non-volatile storage device 836 and can be thin clients or zero client systems. Some Storage devices 836 can be used as an installation device 832 and can be suitable for installing software and programs.

The computing device 800 can include a network interface 834 to interface to the network through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac/ax, CDMA, GSM, WiMax and direct asynchronous connections). The computing device 800 can communicate with other computing devices 800 via any type and/or form of gateway or tunneling protocol e.g. Secure Socket Layer (SSL), Transport Layer Security (TLS) or QUIC protocol. The network interface 834 can include a built-in network adapter, network interface card, PCMCIA network card, EXPRESSCARD network card, card bus network adapter, wireless network adapter, USB network adapter, modem or any other device suitable for interfacing the computing device 800 to any type of network capable of communication and performing the operations described herein.

A computing device 800 of the sort depicted in FIG. 8 can operate under the control of an operating system, which controls scheduling of tasks and access to system resources.

The computing device 800 can be running any operating system configured for any type of computing device, including, for example, a desktop operating system, a mobile device operating system, a tablet operating system, or a smartphone operating system.

The computing device 800 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 800 has sufficient processor power and memory capacity to perform the operations described herein. In some embodiments, the computing device 800 can have different processors, operating systems, and input devices consistent with the device.

In embodiments, the status of one or more machines (e.g., machines associated with the object store 105) in the network can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 800 in response to the CPU 818 executing an arrangement of instructions contained in main memory 820. Such instructions can be read into main memory 820 from another computer-readable medium, such as the storage device 836. Execution of the arrangement of instructions contained in main memory 820 causes the computing device 800 to perform the illustrative processes described herein. One or more processors in a multi-processing arrangement may also be employed to execute the instructions contained in main memory 820. Hard-wired circuitry can be used in place of or in combination with software instructions together with the systems and methods described herein. Systems and methods described herein are not limited to any specific combination of hardware circuitry and software.

Although an example computing system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed:

1. An apparatus comprising a processor and a memory, wherein the memory includes programmed instructions that, when executed by the processor, cause the processor to:
   create a global region that is associated with a first bucket partition and a second bucket partition different from the first bucket partition;
   provide, to the global region, region information of a source region in which a source object is stored, wherein the first bucket partition includes the source region;
   create a destination region in which a destination object is stored, wherein the second bucket partition includes the destination region; and
   provide, to the destination region, from the global region, the region information of the source region.

2. The apparatus of claim 1, wherein the programmed instructions further cause the processor to:
   copy, from the source object to the destination object, object metadata using the region information of the source region.

3. The apparatus of claim 1, wherein the region information of the source region includes a bucket identifier, a partition identifier, and a region identifier.

4. The apparatus of claim 1, wherein the programmed instructions further cause the processor to:
   determine that the destination region is in a different partition than the partition of the source region; and
   create the global region in response to determining that the destination region is in the different partition than the partition of the source region.

5. The apparatus of claim 1, wherein providing, to the global region, the region information of the source region comprises creating a pointer pointing from the global region to the source region, and
   wherein providing, to the destination region, from the global region, the region information of the source region comprises creating a pointer pointing from the destination region to the global region.

6. The apparatus of claim 1, wherein the programmed instructions further cause the processor to:
   in response to deletion of the source object in the source region, determine that the global region points to the source region; and
   based on the determination, preserve the source region, such that a memory of the source region is not reclaimed.

7. The apparatus of claim 1, wherein the region information of the source region includes a physical disk location.

8. A non-transitory, computer-readable medium comprising instructions which, when executed by a processor, cause the processor to:
   create a global region that is associated with a first bucket partition and a second bucket partition different from the first bucket partition;
   provide, to the global region, region information of a source region in which a source object is stored, wherein the first bucket partition includes the source region;
   create a destination region in which a destination object is stored, wherein the second bucket partition includes the destination region; and
   provide, to the destination region, from the global region, the region information of the source region.

9. The medium of claim 8, wherein the programmed instructions further cause the processor to:
   copy, from the source object to the destination object, object metadata using the region information of the source region.

10. The medium of claim 8, wherein the region information of the source region includes a bucket identifier, a partition identifier, and a region identifier.

11. The medium of claim 8, wherein the programmed instructions further cause the processor to:
   determine that the destination region is in a different partition than the partition of the source region; and
   create the global region in response to determining that the destination region is in the different partition than the partition of the source region.

12. The medium of claim 8, wherein providing, to the global region, the region information of the source region comprises creating a pointer pointing from the global region to the source region, and
   wherein providing, to the destination region, from the global region, the region information of the source region comprises creating a pointer pointing from the destination region to the global region.

13. The medium of claim 8, wherein the programmed instructions further cause the processor to:
   in response to deletion of the source object in the source region, determine that the global region points to the source region; and
   based on the determination, preserve the source region, such that a memory of the source region is not reclaimed.

14. The medium of claim 8, wherein the region information of the source region includes a physical disk location.

15. A computer-implemented method comprising:
   creating a global region that is associated with a first bucket partition and a second bucket partition different from the first bucket partition;
   providing, to the global region, region information of a source region in which a source object is stored, wherein the first bucket partition includes the source region;
   creating a destination region in which a destination object is stored, wherein the second bucket partition includes the destination region; and
   providing, to the destination region, from the global region, the region information of the source region.

16. The method of claim 15, further comprising copying, from the source object to the destination object, object metadata using the region information of the source region.

17. The method of claim 15, wherein the region information of the source region includes a bucket identifier, a partition identifier, and a region identifier.

18. The method of claim 15, further comprising:
   determining that the destination region is in a different partition than the partition of the source region; and
   creating the global region in response to determining that the destination region is in the different partition than the partition of the source region.

19. The method of claim 15, wherein providing, to the global region, the region information of the source region comprises creating a pointer pointing from the global region to the source region, and
   wherein providing, to the destination region, from the global region, the region information of the source region comprises creating a pointer pointing from the destination region to the global region.

20. The method of claim 15, further comprising:
   in response to deletion of the source object in the source region, determining that the global region points to the source region; and
   based on the determination, preserving the source region, such that a memory of the source region is not reclaimed.

* * * * *